(12) United States Patent
Hong

(10) Patent No.: US 7,370,873 B2
(45) Date of Patent: May 13, 2008

(54) BICYCLE DRIVE UNIT OF MULTI PEDALING TYPE

(76) Inventor: Jae Ho Hong, 21-203 Jogong Apt, 32 Goean-Dong, Sosa-Gu, Bucheon-Si Gyeonggi-Do (KR)

( * ) Notice: Subject to any disclaimer, the term of this patent is extended or adjusted under 35 U.S.C. 154(b) by 393 days.

(21) Appl. No.: 10/553,458

(22) PCT Filed: May 13, 2004

(86) PCT No.: PCT/KR2004/001128

§ 371 (c)(1),
(2), (4) Date: Oct. 17, 2005

(87) PCT Pub. No.: WO2004/101352

PCT Pub. Date: Nov. 25, 2004

(65) Prior Publication Data

US 2006/0264287 A1 Nov. 23, 2006

(30) Foreign Application Priority Data

May 13, 2003 (KR) ...................... 10-2003-0030410

(51) Int. Cl.
*B62M 1/02* (2006.01)
*F16H 3/44* (2006.01)

(52) U.S. Cl. .................. 280/260; 280/259; 280/253; 280/257; 280/255; 475/297; 475/289; 475/296; 475/312

(58) Field of Classification Search ............... 280/260, 280/259, 253, 257, 255; 475/297, 289, 296, 475/312
See application file for complete search history.

(56) References Cited

U.S. PATENT DOCUMENTS

| | | | |
|---|---|---|---|
| 4,036,068 A | 7/1977 | Gilbert | |
| 4,571,219 A | 2/1986 | Breden et al. | |
| 5,242,028 A | 9/1993 | Murphy et al. | |
| 5,800,302 A | 9/1998 | Werre | |
| 6,007,441 A | 12/1999 | Tysver | |
| 6,048,287 A * | 4/2000 | Rohloff | 475/297 |
| 6,390,487 B1 * | 5/2002 | Yoo | 280/237 |
| 6,419,252 B1 * | 7/2002 | Park et al. | 280/237 |
| 6,852,060 B1 * | 2/2005 | Ash | 475/296 |
| 2005/0173889 A1 * | 8/2005 | Matsumoto et al. | 280/260 |
| 2005/0217914 A1 * | 10/2005 | Sugimoto | 180/205 |

\* cited by examiner

*Primary Examiner*—Tony Winner
*Assistant Examiner*—Marlon Arce-Diaz
(74) *Attorney, Agent, or Firm*—IPLA P.A.; James E. Bame

(57) ABSTRACT

The present invention relates to a bicycle drive unit of multiple pedaling modes, comprising a drive shaft on one side having a counterclockwise one-way clutch and a clockwise one-way clutch coupled thereto by means of sunk keys and the drive shaft is engaged with a ring gear having an outer circumference attached to a chain sprocket; a plurality of hollow turnabout gears engaged with the central gear of the drive shaft; a drive shaft on the other side having one side rotatably inserted into an inner bearing housing that is integrally formed with the rotary plate and the other side coupled to the inner wheels of the clockwise one-way clutch and the counterclockwise one-way clutch by means of the sunk keys and a plurality of turnabout gears, a two-way turnabout gear and a hollow turnabout gear.

5 Claims, 7 Drawing Sheets

First column
Cross section of a group of clockwise one-way clutches

Fourth column
Cross section of a group of clockwise one-way clutche

Second column
Cross section of a group of
counterclockwise one-way clutches

Third column
Cross section of a group of
counterclockwise one-way clutches

FIG 3a

| Cross sectional view | Symbol | Name | One driving shaft clockwise rotation | One driving shaft (counterclockwise rotation) | The other driving shaft (clockwise rotation) | The other driving shaft (counterclockwise rotation) |
|---|---|---|---|---|---|---|
| (Cross section of a group of clockwise one-way clutches in one column) | S1 | One driving shaft | Clockwise rotation | Counterclockwise rotation | Stopped | Stopped |
| | A | Inner wheel of clockwise one-way clutch | Clockwise rotation | Counterclockwise rotation | Stopped | Stopped |
| | A | Outer wheel of clockwise one-way clutch | Clockwise rotation | Passive clockwise rotation | Passive clockwise rotation | Passive clockwise rotation |
| | 11 | Flange | Clockwise rotation | Passive clockwise rotation | Passive clockwise rotation | Passive clockwise rotation |
| | 9 | Ring gear | Clockwise rotation | Clockwise rotation | Clockwise rotation | Clockwise rotation |
| | | Result | Bicycle moves forward | Bicycle moves forward | Bicycle moves forward | Bicycle moves forward |
| | | Others | In forward movement inner wheel transfers power to outer wheel | When inner wheel is rotated in the counterclockwise direction, outer wheel idles in the clockwise direction | When inner wheel is rotated in the counterclockwise direction, outer wheel idles in the clockwise direction | When inner wheel is rotated in the counterclockwise direction, outer wheel idles in the clockwise direction |
| | | ‡ Specialty | The cross-section structure of the first column is the same as those of the fourth column whereby one driving shaft and the other driving shaft have the same rotational speed ratio. | | | |

FIG 3b

| Cross sectional view | Symbol | Name | One driving shaft (clockwise rotation) | One driving shaft (counterclockwise rotation) | The other driving shaft (clockwise rotation) | The other driving shaft (counterclockwise rotation) |
|---|---|---|---|---|---|---|
| (Cross section of a group of counterclockwise one-way clutches in second column) 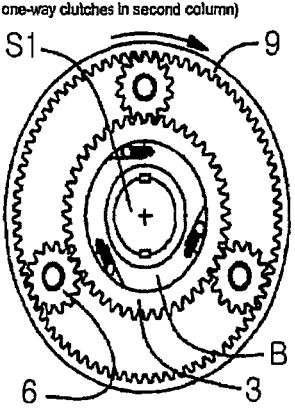 | S1 | One driving shaft | Clockwise rotation | Counterclockwise rotation | Stopped | Stopped |
| | B | Outer wheel of counterclockwise one-way clutch | Clockwise rotation | Counterclockwise rotation | Stopped | Stopped |
| | B | Inner wheel of counterclockwise one-way clutch | Passive counterclockwise rotation | Counterclockwise rotation | Passive counterclockwise rotation | Passive clockwise rotation |
| | 3 | Central gear | Passive counterclockwise rotation | Counterclockwise rotation | Passive counterclockwise rotation | Passive clockwise rotation |
| | 6 | Hollow turnabout gear | Passive counterclockwise rotation | Clockwise rotation | Passive counterclockwise rotation | Counterclockwise rotation |
| | 9 | Ring gear | Clockwise rotation | Clockwise rotation | Clockwise rotation | Clockwise rotation |
| | | Result | Bicycle moves forward | Bicycle moves forward | Bicycle moves forward | Bicycle moves forward |
| | | Others | When inner wheel is rotated in the clockwise direction, outer wheel idles in the counterclockwise direction against inner wheel | When inner wheel is rotated in the counterclockwise direction, outer wheel transfers power | Driving shaft is separated and outer wheel idles in the counterclockwise direction | Driving shaft is separated and inner wheel idles in the counterclockwise direction |

FIG 3c

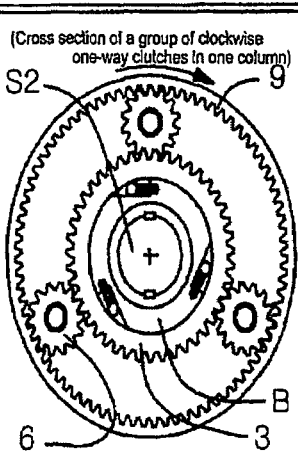

| Cross sectional view | Symbol | Name | One driving shaft (clockwise rotation) | One driving shaft (counterclockwise rotation) | The other driving shaft (clockwise rotation) | The other driving shaft (counterclockwise rotation) |
|---|---|---|---|---|---|---|
| (Cross section of a group of clockwise one-way clutches in one column) | S2 | The other driving shaft | Stopped | Stopped | Clockwise rotation | Counterclockwise rotation |
| | B | Inner wheel of counterclockwise one-way clutch | Stopped | Stopped | Clockwise rotation | Counterclockwise rotation |
| | B | Outer wheel of counterclockwise one-way clutch | Passive counter-clockwise rotation | Passive counter-Clockwise rotation | Passive counter-clockwise rotation | Counterclockwise rotation |
| | 3 | Central gear | Passive counter-clockwise rotation | Passive counter-clockwise rotation | Passive counter-clockwise rotation | Counterclockwise rotation |
| | 6 | Hollow turnabout gear | Passive clockwise rotation | Passive clockwise rotation | Passive clockwise rotation | Clockwise rotation |
| | 9 | Ring gear | Clockwise rotation | Clockwise rotation | Clockwise rotation | Clockwise rotation |
| | | Result | Bicycle moves forward | Bicycle moves forward | Bicycle moves forward | Bicycle moves forward |
| | | Others | Driving shaft is separated and outer wheel idles in the counterclockwise direction | Driving shaft is separated and outer wheel idles in the counterclockwise direction against inner wheel | When inner wheel is rotated in the clockwise direction, outer wheel idles in the counterclockwise direction against inner wheel | In counterclockwise rotation, outer wheel transfers power. |

FIG 3d

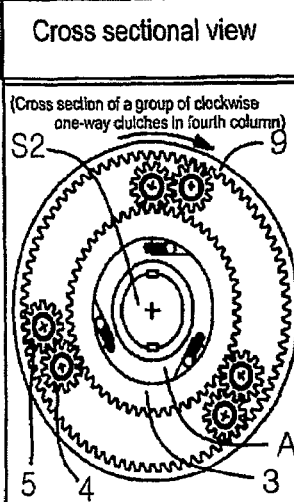

| Cross sectional view | Symbol | Name | One driving shaft (clockwise rotation) | One driving shaft (counterclockwise rotation) | The other driving shaft (clockwise rotation) | The other driving shaft (counterclockwise rotation) |
|---|---|---|---|---|---|---|
| (Cross section of a group of clockwise one-way clutches in fourth column) | S2 | The other driving shaft | Stopped | Stopped | Clockwise rotation | Counterclockwise rotation |
| | A | Inner wheel of clockwise one-way clutch | Stopped | Stopped | Clockwise rotation | Counterclockwise rotation |
| | A | Outer wheel of clockwise one-way clutch | Passive clockwise rotation | Passive clockwise rotation | Clockwise rotation | Passive clockwise rotation |
| | 3 | Central gear | Passive clockwise rotation | Passive clockwise rotation | Clockwise rotation | Passive clockwise rotation |
| | 4 | Turnabout gear | Passive counter-clockwise rotation | Passive counter-clockwise rotation | Counterclockwise rotation | Passive counter-clockwise rotation |
| | 5 | Second turnabout gear | Passive clockwise rotation | Passive clockwise rotation | Clockwise rotation | Passive clockwise rotation |
| | 9 | Ring gear | Clockwise rotation | Clockwise rotation | Clockwise rotation | Clockwise rotation |
| | | Result | Bicycle moves forward | Bicycle moves forward | Bicycle moves forward | Bicycle moves forward |
| | | Others | Outer wheel idles against inner wheel | Outer wheel idles against inner wheel | In the clockwise direction, inner wheel transfers power to outer wheel | When inner wheel is rotated in the counterclockwise direction, outer wheel idles in the clockwise direction. | under a bicycle body and reciprocally move in the same direction with pedals by using bearings.

BICYCLE DRIVE UNIT OF MULTI PEDALING TYPE

TECHNICAL FIELD

The present invention relates to a bicycle drive type. More particularly, the present invention relates to a bicycle drive unit wherein right and left pedals are independently moved and a bicycle is always moved forward regardless of an angle even when the pedals are stepped on forward or backward using one foot or both feet, and the bicycle is moved backward, if necessary.

BACKGROUND ART

A bicycle is usually driven by means of clockwise pedaling. Thus, a driver has to keep a certain posture for a long time while driving the bicycle. Further, leg muscles are concentrated used in a single direction. This makes its exercise effect reduced in terms of the quantity of motion and a feeling of fatigue increased.

Moreover, in case of a slope, although the weight of a driver is inclined behind, the pedaling must move in the clockwise direction. This makes the driver feel tired as higher as several times than a flat. Accordingly, there are problems in that lots of load is applied to the leg and the driver loses interest in riding the bicycle.

DISCLOSURE OF INVENTION

Accordingly, the present invention has been made in view of the above problems, and it is an object of the present invention to provide a bicycle drive unit of multi-pedaling modes wherein a bicycle is moved forward based on several tens of pedaling modes whereby a driver's muscles are uniformly used, increasing the quantity of motion and reducing a feeling of fatigue, the bicycle is moved with less force on a slope, etc. and interest in riding the bicycle increases.

In order to accomplish the above objects, there is provided a bicycle drive unit of a multi-pedaling mode, comprising: a drive shaft on one side having a counterclockwise one-way clutch and a clockwise one-way clutch coupled thereto by means of sunk keys, wherein the counterclockwise one-way clutch has a central gear coupled thereto, and the drive shaft is engaged with a ring gear having an outer circumference attached to a chain sprocket; a plurality of hollow turnabout gears engaged with the central gear of the drive shaft; a drive shaft on the other side having one side rotatably inserted into an inner bearing housing that is integrally formed with the rotary plate and the other side coupled to the inner wheels of the clockwise one-way clutch and the counterclockwise one-way clutch by means of the sunk keys, wherein the inner wheel of the central gear is cold press-fitted and coupled to the outer wheel of the clockwise one-way clutch and the drive shaft is engaged with the ring gear having the outer circumference attached to the chain sprocket and the inner circumference having gears of a saw tooth shape formed therein; and a plurality of turnabout gears, a two-way turnabout gear and a hollow turnabout gear all of which are coupled to the rotary plate and engaged with the central gear of the drive shaft.

It is preferred that a flange is press-fitted and coupled to the outer wheel of the clockwise one-way clutch on the drive shaft and is connected to the ring gear by means of a locking screw.

Furthermore, according to the present invention, a support bearing is inserted into the inner circumference of the ring gear, and the inner wheel of the support bearing is coupled to an outer circumference of an outer bearing housing, whereby the ring gear is prevented from fluctuating and deviating when being rotated and has a stabilized rotational force.

Furthermore, according to the present invention, the central gear inserted into the outer wheel of the clockwise one-way clutch of the drive shaft, the turnabout gear and the two-way turnabout gear are assembled into the outer circumference of the clockwise one-way clutch of the drive shaft, whereby the drive shaft and the drive shaft have the same speed when rotating.

Also, Furthermore, according to the present invention, the bicycle drive unit further comprises detent pins inserted into a plurality of holes formed in the inner bearing housing; a brace attached to the outer circumference of the outer bearing housing by means of the locking screw; a detent pin guide coupled to the brace; a return spring inserted into the detent pin guide; and a rear movement control unit having detent latches and hand levers connected to the detent pins by means of steel wires, whereby the bicycle is moved backward by manipulating the hand lever.

BRIEF DESCRIPTION OF DRAWINGS

Further objects and advantages of the invention can be more fully understood from the following detailed description taken in conjunction with the accompanying drawings in which:

FIG. 3a is a cross-sectional view showing a group of first column clockwise one-way clutches of the bicycle drive unit according to the present invention;

FIG. 3b is a cross-sectional view showing a group of second column counterclockwise one-way clutches of the bicycle drive unit according to the present invention;

FIG. 3c is a cross-sectional view showing a group of third column counterclockwise one-way clutches of the bicycle drive unit according to the present invention; and FIG. 3d is a cross-sectional view showing a group of fourth column clockwise one-way clutches of the bicycle drive unit according to the present invention.

BEST MODE FOR CARRYING OUT THE INVENTION

The present invention will now be described in detail in connection with preferred embodiments with reference to the accompanying drawings.

Figure 1:
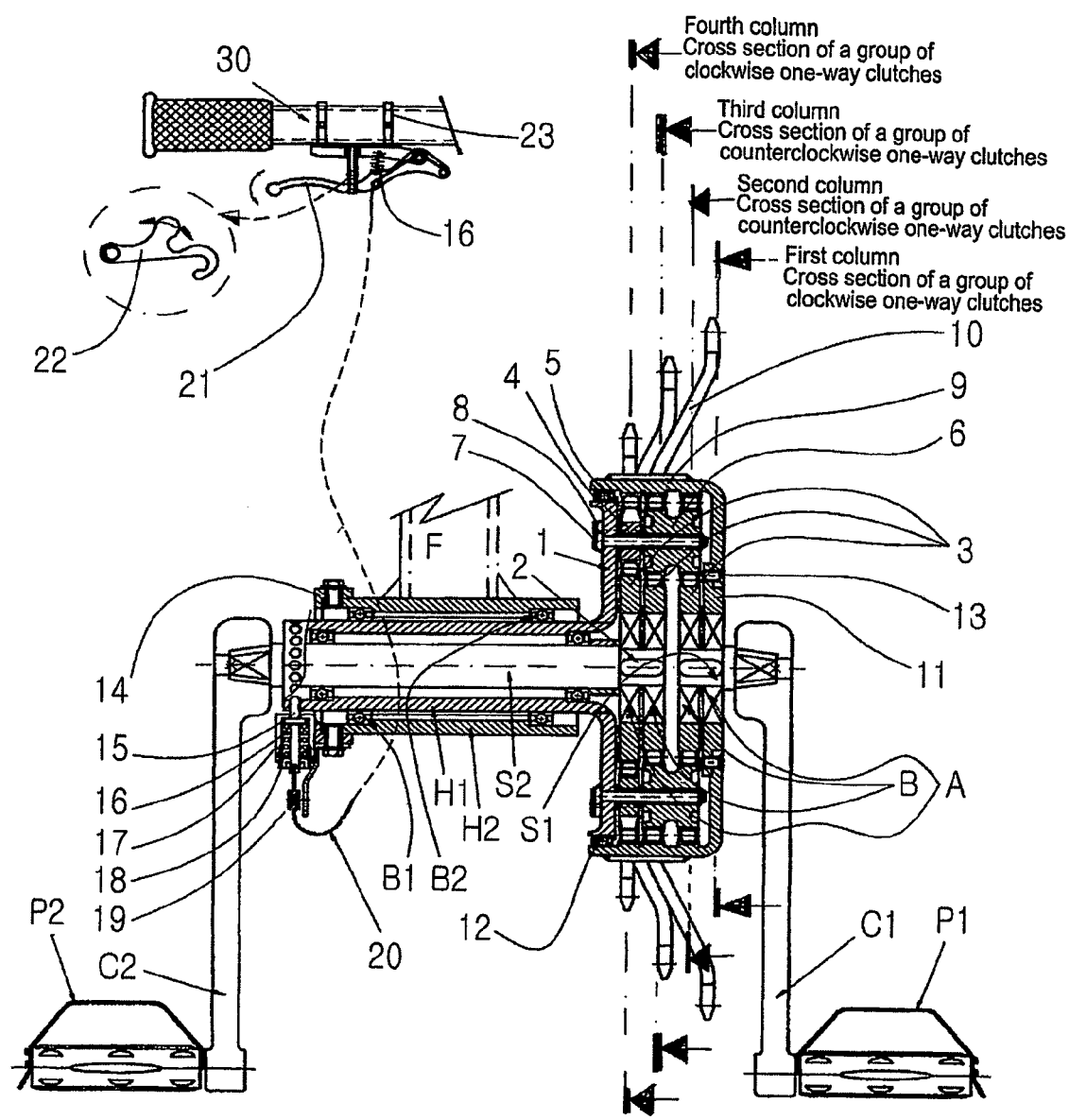
FIG. 1 is a cross-sectional view showing the bicycle drive unit according to an embodiment of the present invention.
Figure 2A:
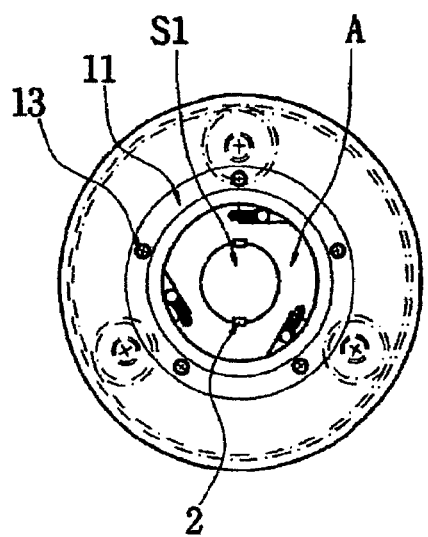
FIG. 2a is a cross-sectional view showing a group of clockwise one-way clutches of the bicycle drive unit shown in FIG. 1.

FIG. 1 is a cross-sectional view showing the bicycle drive unit according to an embodiment of the present invention. FIGS. 2a and 2b are detailed views of the bicycle drive unit shown in FIG. 1. FIGS. 3a to 3d show operational relationship in the bicycle drive unit according to the present invention.

In a common bicycle wherein pedals are stepped on to move the rear wheel of the bicycle in a clockwise direction, a bicycle drive unit according to the present invention includes a drive shaft S1 on one side and a drive shaft S2 on the other side which are each disposed on the right and left sides; and a pedal P1 on one side and a pedal P2 on the other side each of which has a saddle at one end of each of the drive shaft S1 and the drive shaft S2. In the above, the pedals P1 and P2 are attached to the ends of the pedal cranks C1 and C2. The saddles can rotate the pedal cranks C1 and C2 in the counterclockwise direction by lifting up the pedals with the top of the foot.

In the above, the drive shaft S2 has one side inserted into the inner wheel of an inner bearing B1 within an inner bearing housing H1 integrally formed with a rotary plate 1 so that it can rotate within the inner wheel of the inner bearing B1. Further, one side of the drive shaft is connected to the pedal crank C2. The other side of the drive shaft is press-fitted into the inner wheels of a clockwise one-way clutch A and the counterclockwise one-way clutch B and is then forcedly fitted into with a sunk key 2 on the axis.

Figure 2A:
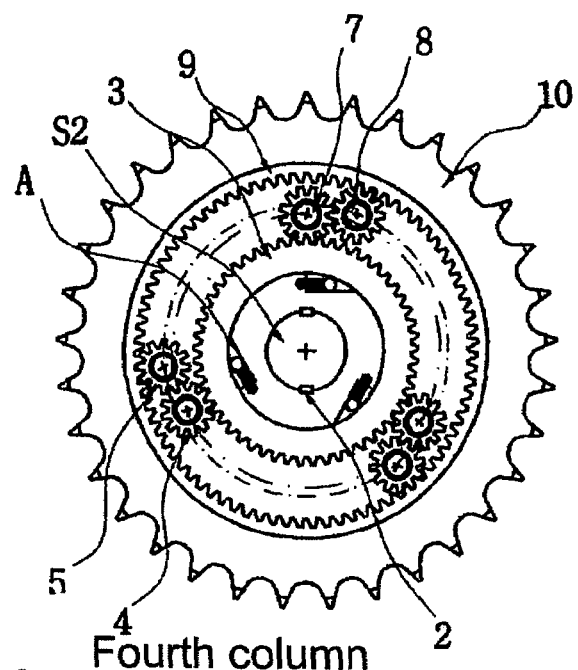
Figure 2B:
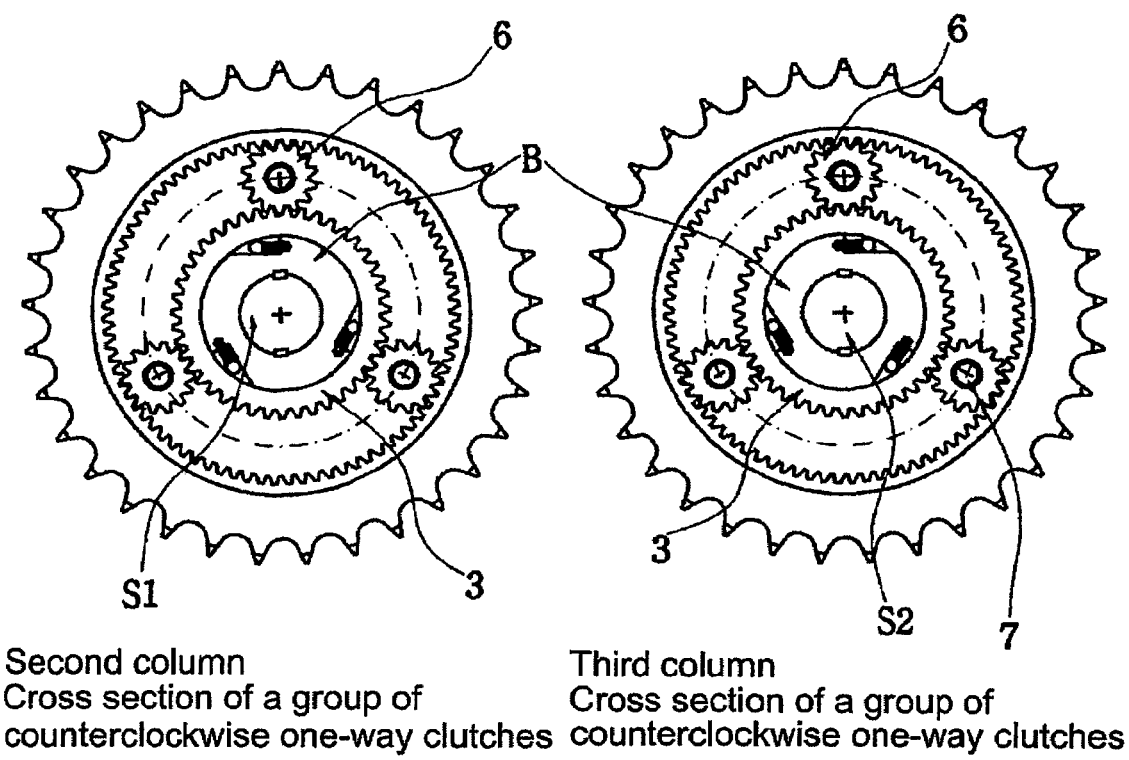
FIG. 2b is a cross-sectional view showing a group of counterclockwise one-way clutches of the bicycle drive unit shown in FIG. 1.

Furthermore, the outer wheel of the clockwise one-way clutch A has a central gear 3 of saw teeth cold press-fitted thereto, as shown in FIG. 2 and FIG. 3d. Three or four turnabout gears 4 engaged with the outer wheel of the clutch A and three or four two-way turnabout gears 5 engaged with the turnabout gears 4 are coupled with the rotary plate 1 by means of a fixed pin 7 and a second fixed pin 8 in such a way to rotate smoothly. The clockwise one-way clutch A has an outer circumference attached to a chain sprocket 10 and an inner circumference engaged with a ring gear 9 on which gears of the saw tooth shape are formed.

In addition, the inner wheel of the central gear 3 is cold press-fitted into the outer wheel of the counterclockwise one-way clutch B, as shown in FIG. 2 and FIG. 3c. Three or four hollow turnabout gears 6 are connected to the rotary plate 1 by means of the fixed pin 7. The counterclockwise one-way clutch B is engaged with the ring gear 9 having the chain sprocket 10 attached thereto.

Meanwhile, the inner wheels of the counterclockwise one-way clutch B and the clockwise one-way clutch A are forcedly fitted into the drive shaft S1 and are press-fitted into the sunk key 2. As shown in FIGS. 2 and 3b, the inner wheel of the central gear 3 is cold press-fitted into the outer wheel of the counterclockwise one-way clutch B and is engaged with the three or four hollow turnabout gears 6 attached to the rotary plate 1 by means of the fixed pins 7. The gears 6 are then engaged with the ring gear 9 having an outer circumference attached to the chain sprocket 10 and an inner circumference in which gears of a saw tooth shape are formed.

The cross-sectional shapes of the second and third columns are the same. The sections are divided into two parts with a gap intervened between the drive shafts S1 and S2.

The central gear 3 fastened to the outer wheel of each of the counterclockwise one-way clutch B is engaged with the three or four hollow turnabout gears 6 disposed around the central gear 3. The hollow turnabout gears 6 are engaged with the ring gear 9. This is for driving the pedals independently in the right and left directions when both the drive shafts S1 and S2 are pedaled in the clockwise and counterclockwise directions, or changing the direction when the pedals are driven with the feet.

As can be seen from the cross-section of the first column on the drive shaft S1, in the outer wheel of the clockwise one-way clutch A, the flange 11 is directly connected to the ring gear 9 to which the chain sprocket 10 is attached by means of a locking screw 13.

In the above, the ring gear 9 has an inner circumference into which support bearings 12 are inserted. The inner wheel of the support bearings 12 is coupled to an outer circumference of the outer bearing housing H2. Thus, the ring gear 9 is prevented from being shaken right and left when being rotated and thus has a stabilized rotational force.

The cross-sectional structure of the first column is the same as that of the first column. In other words, the central gear 3, the turnabout gear 4 and the two-way turnabout gear 5 are sequentially connected by means of the fixed pin 7 and the second fixed pin 8 and are then engaged with the ring gear 9 having the chain sprocket 10 attached thereto. This is for the drive shaft S1 and the drive shaft S2 to have the same rotational speed ratio when the right and left pedals are lifted and down and rotated at the same time. In FIG. 1, unexplained reference numeral F indicates a bicycle frame.

The operation of the bicycle drive unit constructed above according to an embodiment of the present invention will now be described in detail with reference to FIGS. 3a to 3d.

If the inner wheel of the counterclockwise one-way clutch B is rotated in the counterclockwise direction, the rotational force of the counterclockwise one-way clutch B is transferred to the outer wheel thereof. As a result, the inner and outer wheels of the counterclockwise one-way clutch B are rotated in the counterclockwise direction. Meanwhile, if the outer wheel of the counterclockwise one-way clutch B is rotated in the clockwise direction, the rotational force of the counterclockwise one-way clutch B is not transferred to the outer wheel thereof but only the inner wheel idles. At this time, the outer wheel itself of the counterclockwise one-way clutch B is a one-way clutch of a common type, which can idle in the counterclockwise direction.

Furthermore, if the inner wheel of the clockwise one-way clutch A is rotated in the clockwise direction, the rotational force of the clockwise one-way clutch A is transferred to the outer wheel thereof. As a result, the inner and outer wheels of the clockwise one-way clutch A are rotated in the clockwise direction. Meanwhile, if the inner wheel of the clockwise one-way clutch A is rotated in the counterclockwise direction, the rotational force of the clockwise one-way clutch A is not transferred to the outer wheel thereof but only the inner wheel idles. At this time, the outer wheel itself of the clockwise one-way clutch A is a one-way clutch of a common type, which can idle in the counterclockwise direction.

If the pedal crank C1 is lifted by the pedal P1 having the saddle attached thereto and the drive shaft S1 is thus rotated in the counterclockwise direction, the inner wheel of the clockwise one-way clutch A in the first column idles in the counterclockwise direction against the outer wheel together with the drive shaft S1. The inner wheel of the counterclockwise one-way clutch B in the second column is also rotated in the counterclockwise direction. At this time, in view of the characteristics of the counterclockwise one-way clutch B, if the inner wheel of the counterclockwise one-way clutch B is rotated in the counterclockwise direction, the rotational force thereof is transferred to the outer wheel. The central gear 3 integrated with the outer wheel of the counterclockwise one-way clutch B is thus rotated in the counterclockwise direction.

Moreover, the rotary direction of the hollow turnabout gear 6 engaged with the central gear is also changed and is thus rotated in the clockwise direction. Also, the rotational force of the hollow turnabout gear 6 is transferred to the ring gear 9 of the chain sprocket 10, which is then rotated in the clockwise direction and the bicycle is thus moved forward.

In the above, the outer wheel of the clockwise one-way clutch A in the first column is rotated in the clockwise direction since it is connected to the ring gear 9 and the flange 11. In view of the characteristics of the clockwise one-way clutch A, if the inner wheel of the clockwise one-way clutch A is rotated in the counterclockwise direction, the outer wheel thereof is not applied with the rotational force thereof but idles in the opposite direction to the inner wheel. Therefore, there is no interference. Meanwhile, in the third column, the anti-rotational force of the drive shaft S1 is not applied to the drive shaft S2 because the driving shaft S1 is separated from the drive shaft S2.

However, the hollow turnabout gears 6 are rotated in the clockwise direction, which then makes the central gear 3 fastened to the outer wheel of the counterclockwise one-way clutch B in the third column rotate in the counterclockwise direction. In view of the characteristics of the counterclockwise one-way clutch B, if the outer wheel of the clutch B is rotated in the counterclockwise direction, it idles against the inner wheel thereof. Consequently, if the drive shaft S1 is rotated in the counterclockwise direction, the drive shaft S2 coupled to the inner wheel of the counterclockwise one-way clutch B in the third column is not applied with any rotational force. Therefore, the drive shaft S2 does not move.

In the above, in the fourth column, as the ring gear 9 is rotated in the clockwise direction, the two-way turnabout gear 5 engaged with the ring gear 9 is also rotated in the clockwise direction. The turnabout gear 4 engaged with the two-way turnabout gear 5 is rotated in the counterclockwise direction. The rotational force of the turnabout gear 4 at this time rotates the central gear 3 attached to the outer wheel of the clockwise one-way clutch A in the fourth column in the clockwise direction. In view of the characteristics of the clockwise one-way clutch A, however, if the outer wheel of the turnabout gear 4 is rotated in the clockwise direction, it idles against the inner wheel thereof. Therefore the inner wheel of the turnabout gear 4 is not applied with the rotational force thereof. Consequently, the drive shaft S2 coupled thereto does not move but the bicycle moves forward.

In the above, if the pedal is stepped down to rotate the pedal crank C1 and the drive shaft S1 in the clockwise direction, the inner wheel of the clockwise one-way clutch A on the first column is rotated in the counterclockwise direction, as shown in FIG. 2a. The rotational force thereof at this time is transferred to the outer wheel of the clockwise one-way clutch A to rotate the flange 11 and the ring gear 9 to which the chain sprocket 10 is connected in the clockwise direction. Thus the bicycle is driven.

Furthermore, if the inner wheel of the counterclockwise one-way clutch B in the second column, which is coupled to the same drive shaft S1, is rotated in the clockwise direction, in view of the characteristics of the counterclockwise one-way clutch B, the inner wheel of the clutch B does not transfer the rotational force thereof to the outer wheel thereof but idles. Thus, the inner wheel of the clutch B only idles in the clockwise direction together with the drive shaft S1.

In addition, if the drive shaft S1 is rotated in the clockwise direction, the rotational force of the drive shaft S1 is not applied to the drive shaft S2 since the drive shaft S1 is separated from the drive shaft S2. As the ring gear 9 is rotated in the clockwise direction, however, the hollow turnabout gears 6 of the second and third columns are also rotated in the clockwise direction. The central gears 3 of the second and third columns, which are engaged with the hollow turnabout gears 6, are rotated in the counterclockwise direction. As each of the central gears 3 of the second and third columns are coupled to the outer wheel of the counterclockwise one-way clutch B, the outer wheel of the counterclockwise one-way clutch B does not transfer the rotational force of the counterclockwise direction to the inner wheel thereof but idles. The drive shaft S2 does not move.

Further, in the event that the ring gear 9 having the chain sprocket 10 attached thereto is rotated in the clockwise direction to drive the bicycle, the two-way turnabout gears 5 of the fourth column are rotated in the clockwise direction. The turnabout gears 4 engaged with the gears 5 are also rotated in the counterclockwise direction. The turnabout gears 4 rotate the central gear 3 of the fourth column in the clockwise direction. In view of the characteristics of the clockwise one-way clutch A, however, if the outer wheel of the clockwise one-way clutch A is rotated in the clockwise direction, the inner wheel thereof is not applied with the rotational force, but idles in the clockwise direction. Accordingly, no rotational force is transferred to the drive shaft S2.

Therefore, when the drive shaft S1 is rotated in the clockwise or counterclockwise direction, nothing external force is applied to the drive shaft S2 and the pedal crank C2 thus does not move.

As described above, if the drive shaft S1 is rotated in the clockwise or counterclockwise direction, the ring gear 9 having the chain sprocket 10 attached thereto becomes always a clockwise direction output, thereby moving the bicycle forward. However, as no external force is applied to the drive shaft S2, the drive shaft S2 does not move.

When the drive shaft S2 is rotated in the clockwise or counterclockwise direction, the bicycle moves forward but the drive shaft S1 does not move, as shown in FIGS. 3a to 3d. Therefore, the right and left pedals can be driven independently. When both feet lifted or let down at the same time, the pedal is rotated in the clockwise or counterclockwise direction, and the bicycle is rotated 360 degree in the clockwise direction like an existing bicycle or is rotated 360 degree in the counterclockwise direction, the bicycle always moves forward. Meanwhile, several tens of the type of bicycle pedaling can be described in short.

A. 12 to 6 o' clock in the clockwise direction

1 When one pedal is lifted, bicycle moves forward
2 When one pedal is stepped down, bicycle moves forward
3 When the other pedal is lifted, bicycle moves forward
4 When the other pedal is stepped down, bicycle moves forward
5 When two feet are lifted at the same time, bicycle moves forward
6 When two feet are stepped down up at the same time, bicycle moves forward
7 When two feet move up and down alternately, (Forward walking operation)

B. 12 to 6 o' clock in the counterclockwise direction

8 When one pedal is lifted, bicycle moves forward
9 When one pedal is stepped down, bicycle moves forward
10 When the other pedal is lifted, bicycle moves forward
11 When the other pedal is stepped down, bicycle moves forward
12 When two feet are lifted at the same time, bicycle moves forward
13 When two feet are stepped down up at the same time, bicycle moves forward
14 When two feet move up and down alternately, (Backward walking operation)

C. 3 to 9 o' clock in the clockwise direction

15 When one pedal is pushed forward
16 When one pedal is pulled backward
17 When the other pedal is pushed forward
18 When the other pedal is pulled backward
19 When two feet are pushed at the same time
20 When two feet are pulled backward at the same time
21 When two feet are pushed and pulled alternately -continued 22 When two feet are pushed and pulled at the same time (Paddle motion)
   D. 3 to 9 o' clock in the counterclockwise direction 23 When one pedal is pushed forward
24 When one pedal is pulled backward
25 When the other pedal is pushed forward
26 When the other pedal is pulsed backward
27 When both feet are pushed at the same time
28 When both feet are pulled backward at the same time
29 When two feet are pushed and pulled alternately
30 When two feet are pushed and pulled at the same time (Paddle motion)
   E. 360 degree circular motion 31 360 degree clockwise rotation with one foot
32 360 degree clockwise rotation with the other foot
33 360 degree counterclockwise rotation with one foot
34 360 degree counterclockwise rotation with the other foot
35 360 degree clockwise rotation with two feet at the same time
36 360 degree counterclockwise rotation with two feet at the same time
37 360 degree clockwise rotation in the same manner as existing bicycle
38 360 degree counterclockwise rotation contrary to existing bicycle
   F. Others 39 Seesaw motion with two feet outstretched
40 Various application motions through pedal method The outputs of the pedaling motions are always rotated in the clockwise direction regardless of an angle, the rotary direction of the pedal, and the right and left pedals. The bicycle is thus moved in the clockwise direction.

However, if the bicycle is pulled backward after the bicycle is parked or the bicycle is pulled and moved backward in order to change its direction at an alley, the bicycle has a structure in which its output is always rotated only in the clockwise direction since both the clockwise one-way clutch A and the counterclockwise one-way clutch B are positioned therein. If the bicycle is pulled backward for backward movement, its output direction cannot be changed since the ring gear 9 to which the chain sprocket 10 is attached itself is moved in the counterclockwise direction. Consequently, it results in a bicycle that is not moved backward.

Therefore, there is a phenomenon that the bicycle is not moved backward and the rear wheel of the bicycle slips backward. Of course, a current bicycle has no problem due to its lightweight. In the present invention, a control unit is attached to the bicycle for backward movement, if necessary. This will now be described with reference to FIG. 1.

A plurality of holes are formed at the end of the outer circumference of the inner bearing housing H1, wherein detent pins 15 are inserted into the holes. A brace 14 is attached to the end of the outer circumference of the outer bearing housing H2 by means of a locking screw 13. A detent pin 15 and a return spring 16 are inserted into a detent pin guide 17. The tension of the spring is controlled by means of a tension control screw 18.

In the above, if a hand lever 21 is held, the detent pin 15 is moved backward by means of a steel wire 20 through a roller 19. Thus, when the bicycle is moved backward, i.e., the ring gear 9 is rotated in the counterclockwise direction by means of the tension of the chain sprocket 10 due to the rotation of the rear wheel, the inner bearing housing H1 inserted into the inner wheel of the outer bearing B2 within the outer bearing housing H2, the rotary plate 1 integrally formed with the inner bearing housing H1, respective gears connected by the rotary plate 1 and the fixed pins 7, clockwise and counterclockwise one-way clutch A and B coupled to both the drive shafts S1 and S2, and the pedal cranks S1 and S2 are rotated smoothly in the counterclockwise direction along the inner wheel of the outer bearing B2 together with the inner bearing housing H1. Therefore, the bicycle is normally moved backward.

In addition, if the hand lever 21 is released, the detent pin 15 is moved forward and is then inserted into one of the plurality of the holes formed in the inner bearing housing H1 by means of the return spring 16 in such a way to prevent the inner bearing housing H1 and the rotary plate 1 from moving. Accordingly, various pedaling operations such as clockwise and counterclockwise directions are possible.

In the above, the hand lever 21 has a common bicycle steering handle tube 30 fastened by a clamp 23. The hand lever 21 has a detent latch 22 attached thereto. Therefore, if it is desired to move the bicycle backward a little far, the detent latch 22 is turned over with the hand lever 21 held so that the hand lever 21 does not return to the return spring 16. The bicycle steering handle can be towered away backward with the hand lever 21 held.

In the above, the roller 19 can be attached as a guide for detaching the steel wire 20 and changing its direction. This is because the position of the detent pin 15 can be the side not the bottom of the outer bearing housing H2, as shown in FIG. 1.

INDUSTRIAL APPLICABILITY

According to the present invention as described above, a bicycle is driven based on a variety of pedaling modes. Therefore, a user can rotate the bicycle in the clockwise or counterclockwise direction according to desired muscle portion, and can perform forward walking, backward walking, paddle motion, seesaw motion, etc. The user can also use his or her leg muscles uniformly. Therefore, the present invention has effects that the quantity of motion can increase, it can give interest to a user unlike an existing long and monotonous pedaling mode, and anyone can enjoy riding the bicycle without a feeling of fatigue.

What is claimed is:

1. A bicycle drive unit of multiple pedaling modes, comprising:

a drive shaft (S1) on one side having inner wheels of a counterclockwise one-way clutch (B) and a clockwise one-way clutch (A) coupled thereto by means of sunk keys 2, and engaged with a ring gear 9 having an outer circumference attached to a chain sprocket 10 and an inner circumference having gears of a saw tooth shape formed therein, wherein an inner wheel of a central gear 3 is cold press-fitted to an outer wheel of the counterclockwise one-way clutch (B);

a plurality of hollow turnabout gears 6 engaged with the central gear 3 of the drive shaft (S1);

a drive shaft S2 on the other side having one side rotatably inserted into an inner bearing housing H1 that is integrally formed with the rotary plate 1 and the other side coupled to the inner wheel of the clockwise one-way clutch (A) and the counterclockwise one-way clutch (B) by means of the sunk keys 2, wherein the inner wheel of the central gear 3 is cold press-fitted and coupled to the outer wheel of the clockwise one-way clutch (A), and the drive shaft S2 is engaged with the ring gear 9 having the outer circumference attached to the chain sprocket 10 and the inner circumference having gears of a saw tooth shape formed therein; and a plurality of turnabout gears 4, a two-way turnabout gear 5 and a hollow turnabout gear 6 all of which are coupled to the rotary plate 1 and engaged with the central gear 3 of the drive shaft S2.

2. The bicycle drive unit as claimed in claim 1, wherein a flange (11) is press-fitted and coupled to the outer wheel of the clockwise one-way clutch (A) on the drive shaft S1 and is connected to the ring gear 9 by means of a locking screw 13.

3. The bicycle drive unit as claimed in claim 1 or 2, wherein a support bearing (12) is inserted into the inner circumference of the ring gear (9), and the inner wheel of the support bearing (12) is coupled to an outer circumference of an outer bearing housing H2, whereby the ring gear (9) is prevented from fluctuating and deviating when being rotated and has a stabilized rotational force.

4. The bicycle drive unit as claimed in claim 1, wherein the central gear (3) inserted into the outer wheel of the clockwise one-way clutch (A) of the drive shaft S1, the turnabout gear 4 and the two-way turnabout gear 5 are assembled into the outer circumference of the clockwise one-way clutch A of the drive shaft S1, whereby the drive shaft S1 and the drive shaft S2 have the same speed when rotating.

5. The bicycle drive unit as claimed in claim 1, further comprising:

detent pins (15) inserted into a plurality of holes formed in the inner bearing housing (H1);

a brace 14 attached to the outer circumference of the outer bearing housing H2 by means of the locking screw 13;

a detent pin guide 17 coupled to the brace 14;

a return spring 16 inserted into the detent pin guide 17; and a rear movement control unit having detent latches 22 and hand levers 21 connected to the detent pins (15) by means of steel wires 20, whereby the bicycle is moved backward by manipulating the hand lever 21.

* * * * *